April 19, 1938.  J. McCAVITT  2,114,807
UNIVERSAL JOINT
Filed Nov. 4, 1937

WITNESSES

INVENTOR
John McCavitt
BY
Anderson & Siddy
ATTORNEYS

Patented Apr. 19, 1938

2,114,807

UNITED STATES PATENT OFFICE 2,114,807

UNIVERSAL JOINT

John McCavitt, Atlantic City, N. J.

Application November 4, 1937, Serial No. 172,724

1 Claim. (Cl. 64—9)

The invention relates to universal joints, and has for an object to provide an improved construction which is simple and effective and which will permit the joint to expand and contract during use.

Another object of the invention is to provide a universal joint having male and female members or sections presenting sliding interlocking parts formed to permit one part to mesh in respect to the other while sliding or operating together.

A further object, more specifically, is to provide a universal joint for the drive shaft of an automobile or other similar drive shaft, wherein a supply of lubricant may be maintained in communication with the moving parts of the device.

In the accompanying drawing—

Figure 1:
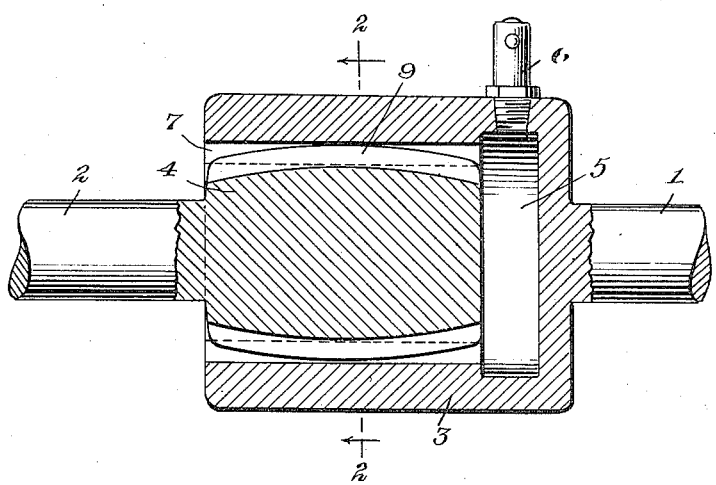
Figure 1 is a longitudinal vertical sectional view through a universal joint disclosing one embodiment of the invention.
Figure 2:
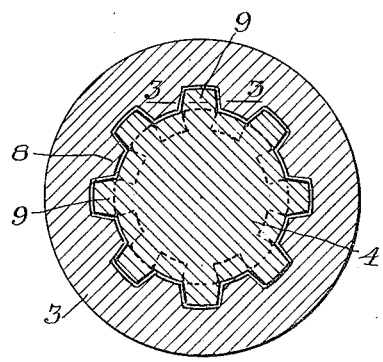
Figure 2 is a sectional view through Figure 1 approximately on the line 2—2.

Referring to the accompanying drawing by numerals, 1 indicates a drive shaft and 2 a driven shaft. These shafts may be in exact alignment or may be slightly out of alignment and yet power may be transmitted from one to the other. Shaft 1 is either formed integral with or rigidly secured to the socket section 3, while the shaft 2 is integral with or rigidly secured to the key section 4 and slidably mounted in the socket section. It will be noted from Figure 1 of the drawing that there is provided a chamber 5 for the reception of oil or grease which may be inserted through a valve 6 and maintained either filled or partly filled for use of the moving parts.

The socket section 3 is provided with what may be termed an internal gear 7. The teeth 8 of this internal gear may be straight and parallel with each other or may be substantially elliptical which would be desired if the shafts 1 and 2 were out of alignment to an appreciable extent. The key section 4 is provided with longitudinally extending teeth coacting with the teeth 8 so that power may be transmitted from the socket section 3 to the key section 4.

Figure 3:
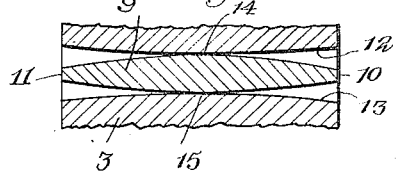
Figure 3 is a sectional view through Figure 2 approximately on the line 3—3.

As shown in Figure 3 of the drawing the teeth 9 are elliptical with blunt ends 10 and 11. The side walls of the teeth 8 are also preferably curved as indicated at 12 and 13. By this construction there is contact between the parts only at points 14 and 15. This will allow shaft 2 to operate out of alignment with shaft 1 particularly as the parts are sufficiently loose to provide an easy sliding engagement. In connection with this feature it will be seen that the two parts may slide appreciably in respect to each other and yet the points 14 and 15 remain in position for engagement with points on the teeth 8. Ordinarily the parts are arranged as shown in Figure 1 wherein the key section 4 is held within the socket section 3, but by reason of the sliding ability of the parts the joint will function appreciably even though the parts slide for a short distance.

When the device is used as part of the drive shaft of an automobile, the rear end of the automobile sometimes moves up and down in respect to the front of the automobile and this causes a slight back-and-forth longitudinal movement of the key section 4 in respect to the socket section 3. The construction will readily permit this action automatically and while the parts are functioning in an efficient manner. It will also be observed that the outer surfaces of the respective teeth 9 are arc-shaped whereby the key section is allowed to swing laterally in respect to the socket section 3 in a more efficient manner.

I claim:

A universal joint including a key section having a driven shaft, and a socket section having a driving shaft, said socket section slidingly fitting over the key section, said socket section being formed with an internal gear structure with the teeth at all points the same distance from the axis of the section, said teeth being substantially elliptical whereby the opening between the teeth is wider at the end than at the center, said key section being formed with arc-shaped teeth of the same depth throughout, each of said teeth in plan being substantially elliptical whereby they will contact with the teeth of the socket section substantially at one point on each side of each tooth, said key section being slidable and rockable in respect to said socket section so as to transmit rotary motion from said socket section with said shafts out of alignment.

JOHN McCAVITT.